Jan. 26, 1960
J. HRDLIČKA
2,922,457
DIVIDED RIM FOR TIRES
Filed Jan. 21, 1958
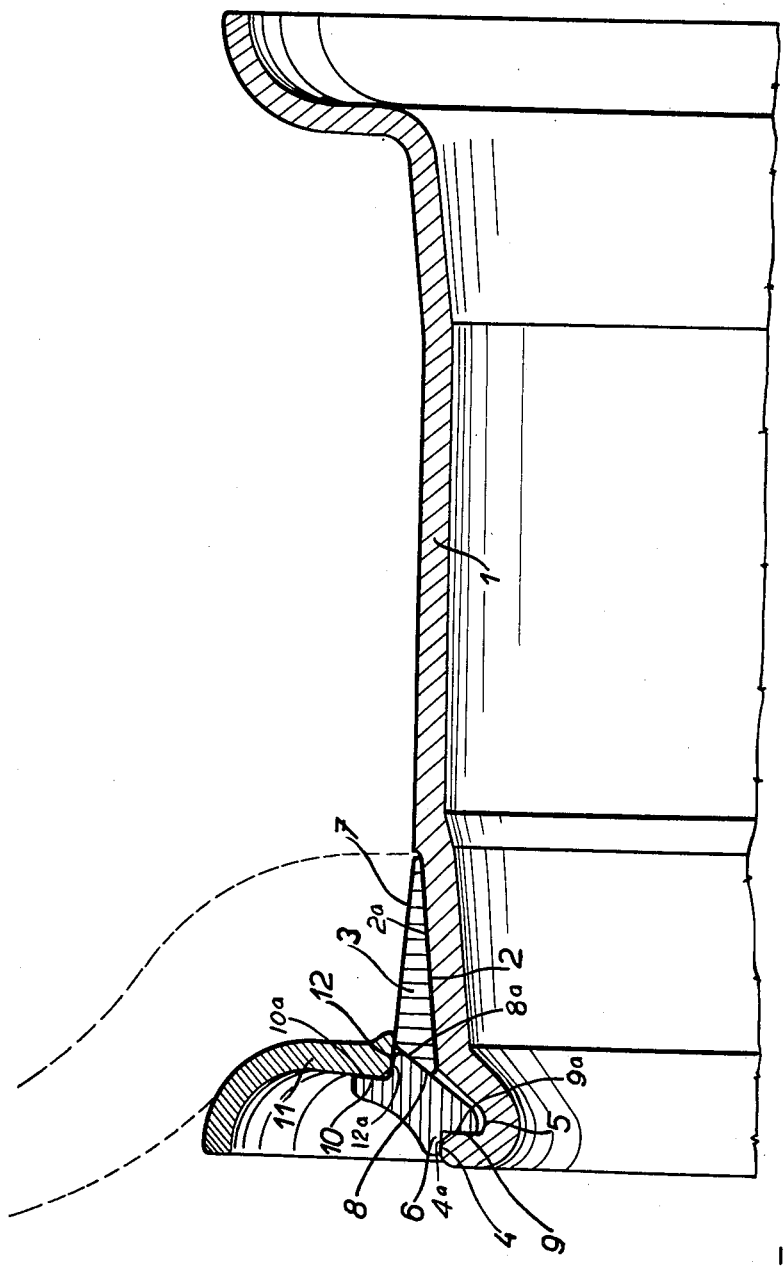
INVENTOR,
JAROSLAV HRDLIČKA United States Patent Office 2,922,457
Patented Jan. 26, 1960

2,922,457
DIVIDED RIM FOR TIRES
Jaroslav Hrdlička, Lahovice, Czechoslovakia
Application January 21, 1958, Serial No. 710,218
Claims priority, application Czechoslovakia January 23, 1957
3 Claims. (Cl. 152—410)

The present invention relates to a divided rim with tapered bearing surfaces for the bead of a pneumatic tire with or without an inner tube.

Divided rims with tapered bearing surfaces for tire beads are intended to replace the so-called flat rims; and they have a wider base, lower edges and the 5% taper of the bearing surfaces and their cross-sections are fixed by the Tire and Rim Association Standards and by national standards derived therefrom in various countries. There are several existing rims conforming to such specifications and formed of two or more parts.

Rims made in two pieces have a removable side-ring with a tapered annular portion adapted to accomodate the tire bead. The ring is slit, i.e., divided in the lateral direction, resilient, and engages in a side groove in the rim base and therefore also forms the closing ring.

Rims made in three pieces are provided with a tapered ring, for accommodating the tire bead; the ring is also slit (divided in the lateral direction), resilient, and adapted to engage in a side groove in the rim base in order to also form a closing ring, which is secured by a removable side ring. Three piece rims may also be provided with a slit (divided in the lateral direction) and resilient side ring, combined with a tapered annulus adapted for receiving the tire bead and secured also by a slit (laterally divided) and resilient closing ring.

Rims made in four parts comprise an independent annulus with a one-sided taper forming the bearing surface for the tire bead. This annulus is slit (laterally divided), resilient and rests with its cylindrical surface on the rim-base which has a side-groove receiving a resilient closing ring which is also slit and serves to secure the side ring.

A common advantage of all the above described existing designs—as compared with the previous flat rims—is the proper accommodation of the tire in the rim on tapered bearing surfaces for the tire beads, resulting in a substantially increased life of the tires. A disadvantage of the two and three-piece rims is—in comparison with the previous flat rims—the difficulty experienced in mounting and dismounting the tire, which is an unavoidable consequence of the combination of two or three rim-parts into a single piece, which is then rather rigid. Even in a four-piece rim design, when dismounting the tire and slipping the ring off the rim-base, it is necessary to overcome the friction between the cylindrical contact surfaces of the ring and the rim-base. It is a common disadvantage of all these designs that they cannot be used for tubeless tires, because, in each case, the component part with the bearing surface for the tire bead is slit and consequently incapable of sealing.

It is an object of the invention to provide a divided rim avoiding all the above described drawbacks.

A further object of the invention is to provide a divided rim representing a new solution of the problem in question.

Other objects and advantages of the present invention will appear from the following disclosure of an illustrative embodiment.

The main feature of the invention consists in the provision of a wedge-shaped ring having tapered radially outer and inner surfaces decreasing and increasing, respectively, in diameter toward the axially inner edge of the ring and by means of which it provides a bearing surface for the tire bead and a contact surface bearing against a tapered surface of the rim-base, with a side ring and the wedge-shaped ring bearing against a closing ring which rests against surfaces of a groove formed in the rim-base so as to secure the closing ring.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

The accompanying drawing represents the rim according to the invention in a cross-sectional view taken in a radial plane.

The rim-base 1 is provided at the outer side, that is, at the side at which the tire is mounted, with a conical surface 2 decreasing in diameter in the axial direction toward the outer edge of the rim-base to receive an annulus 3 of wedge-shaped cross-section which may be formed of steel, hereinafter called wedge-ring. The rim-base 1 has a radially outwardly opening side-groove 5 adjacent its axially outer edge, and the latter has a radially outwardly facing surface 4 which forms the surface for a closing ring 6. The ring 6 is resilient and slit or laterally divided in a radial plane, and has an annular recess to define a radially inward facing surface 4a bearing against the surface 4 of the rim-base and to define an axially outward facing surface 9a bearing against the side surface 9 of the side groove 5. Further, the closing ring 6 has a frusto-conical surface 8 bearing against the frusto-conical axially outer edge surface 8a of wedge ring 3. The ring 6 has a second annular recess defining an axially inward facing surface 10 which bears against a side surface 10a of a side ring 11, and also defining a radially outward facing surface 12a which extends under the edge surface 12 of side ring 11. The closing ring 6 covers the groove 5 protecting it in this way against the entry of impurities (mud, etc.). The wedge ring 3, forming the bearing surface for the tire bead, has tapered radially outer and inner surfaces, that is, its bearing surface 7 for the tire bead and its surface 2a with which it contacts the conical surface 2 of rim base 1 are of conical formation and respectively decrease and increase in diameter in the axially inward direction. Its third or outer edge surface 8a is also conical and represents the bearing surface for the surface 8 of closing ring 6. The side ring 11 abuts in assembled condition against the closing ring 6 along the surface 10 of the latter, and the ring 6 also underlies the surface 12 of side ring 11.

The rim according to the present invention differs from all hitherto known designs of rims with tapered bearing surfaces for the tire beads in that its removable part, that is, the wedge ring 3 having the bearing surface for the tire bead, contacts the rim base at a conical surface. This new design enables the rim to be used for tires with an inner tube when the wedge ring 3 is slit or laterally divided in a radial plane and resilient or for tubeless tires, when the ring 3 is made integral (laterally not divided). A perfect seating of the wedge ring 3 on the rim base 1 and the required sealing are in this case achieved by coating the surface 2a on the wedge ring and/or the surface 2 on the rim base with rubber or another suitable material.

A further advantage of this design is the ease with which mounting and dismounting of the tire can be achieved. After removing the closing ring 6 from the groove 5, which requires the pressing of the side of the tire axially inward only as much as the thickness of the side ring 11, the conical contacting surface 2a of the wedge ring 3 and surface 2 of the rim base 1 are simply axially separated from each other so that it is not necessary to overcome any friction between the wedge ring and the rim base (which friction can be increased by rusting of the contacting surfaces), as in the case of a multipiece rim where these contacting surfaces are of cylindrical formation and where the wedge ring has to be slid axially along the rim base.

In the rim for tires with an inner tube, where the ring 3 is slit (laterally divided), and resilient, after removal of the closing ring 6 from the groove 5 a rim tool is inserted in the gap of the wedge ring 3 (so as to prevent such gap from being closed by the resiliency of the ring and thus also to avoid a reduction of its inner diameter) and the separation of the ring 3 from the rim base 1 takes place just as easily as in the design with the integral (laterally non-divided) ring for tubeless tires.

A further advantage of the rim according to the invention is the relative arrangement and mounting of its removable component parts. Due to the arrangement of the conical surface 2a, with which the wedge ring 3 rests against the conical surface 2 of rim base 1, the wedge ring automatically assumes its correct position in the assembly when the surface 8 on the closing ring 6 bears against the surface 8a of the wedge ring. The wedge ring acts further by a certain component of pressure—which is produced by the tire bead—on the closing ring 6 and the latter reacts against this pressure on the one hand by its resiliency and on the other hand receives and withstands the pressure by protruding with its surface 12a underneath the surface 12 of side-ring 11. The securing of all three removable parts 2, 6 and 11 at the side of the rim, from which the tire is mounted, is therefore mutual and reliable, and their arrangement and mounting eliminate the possibility of a faulty assembly.

Although an illustrative embodiment of the invention has been described in detail herein with reference to the accompanying drawing, it is to be understood that the invention is not limited to that particular embodiment, and that various changes and modifications may be effected in the latter without departing from the scope or spirit of the invention, except as defined in the appended claims.

I claim:

1. A divided rim for use with tube-less tires or tires having inner tubes; said rim comprising a rim-base having a radially outwardly opening groove adjacent its axially outer edge, said groove facing radially outwardly and a frusto-conical surface decreasing in diameter in the axial direction toward said groove, a wedge-ring having frusto-conical radially inner and outer surfaces and a frusto-conical outer edge surface, said radially inner and outer surfaces of the wedge-ring respectively decreasing and increasing in diameter in the axial direction toward said outer edge surface to seat against said bearing surface of the rim-base and to form a bearing surface for a tire bead, said outer edge surface of the wedge-ring decreasing in diameter in the axially outer direction, a closing ring adapted to fit in said groove of the rim-base and having a frusto-conical inner side surface engageable with said outer edge surface of the wedge-ring, said closing ring further having inner and outer annular recesses defining a radially inward facing cylindrical surface and an axially outward facing radial surface and defining a radially outward facing annular surface and an axially inward facing radial surface, respectively, said radially inward facing cylindrical surface of the closing ring seating against said radially outward facing outer edge of the rim base and said axially outwardly facing radial surface of the closing ring seating against a side surface of said groove of the rim-base, and a side-ring having an inner edge surface fitting over said radially outer surface of the wedge-ring and bearing against said radially outwardly facing annular surface of the closing ring, said side-ring further having an outer side surface engaged by said axially inward facing radial surface of the closing ring.

2. A divided rim as in claim 1; wherein said wedge-ring is continuous and has a coating of rubber on said radially inner and outer surfaces so as to provide an air-tight seal with respect to said rim-base and the bead of a tube-less tire.

3. A divided rim as in claim 1; wherein said wedge-ring is continuous and formed of rubber so as to provide an air-tight seal with respect to said rim-base and the bead of a tube-less tire.

References Cited in the file of this patent

UNITED STATES PATENTS

| | | |
|---|---|---|
| 2,700,999 | Lemmerz | Feb. 1, 1955 |
| 2,822,017 | Herzegh | Feb. 4, 1958 |

FOREIGN PATENTS

| | | |
|---|---|---|
| 17,805 | Denmark | Sept. 2, 1913 |
| 691,981 | Great Britain | May 27, 1953 |